United States Patent
Ihashi

(10) Patent No.: US 6,871,449 B2
(45) Date of Patent: Mar. 29, 2005

(54) STRUCTURE OF DOOR OPENING/CLOSING APPARATUS

(75) Inventor: Yoshitomo Ihashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/626,935

(22) Filed: Jul. 25, 2003

(65) Prior Publication Data

US 2004/0020128 A1 Feb. 5, 2004

(30) Foreign Application Priority Data

Jul. 31, 2002 (JP) ........................................ 2002-222977

(51) Int. Cl.7 .............................................. E05F 11/24
(52) U.S. Cl. ....................................................... 49/339
(58) Field of Search .......................... 49/339, 340, 341, 49/475.1, 490.1; 296/50, 106, 146.8

(56) References Cited

U.S. PATENT DOCUMENTS 6,401,392 B1    6/2002  Yuge

2001/0054257 A1 * 12/2001 Wygle et al. .................. 49/349

FOREIGN PATENT DOCUMENTS

JP    2000-335245    12/2000

* cited by examiner

Primary Examiner—Jerry Redman
(74) Attorney, Agent, or Firm—Merchant & Gould P.C.

(57) ABSTRACT

In a door opening/closing apparatus allowing a door opening to have as wide an area as possible, an improved structure is provided which can serve to obviate the need for including a reinforcement structure or an additional seal structure, so that the door opening/closing apparatus can be simplified in structure. An arm member 3 is coupled to a door of a vehicle, and a driving unit 2 is provided inside a vehicle body of the vehicle to move the arm member 3. The arm member 3 is arranged to be protrudable from inside of the vehicle body, through a space which the door D occupies when closed, pushing the door D open and pulling the door D shut. A seal member 8 is provided along an inner peripheral edge of a body panel PB defining a door opening S of the vehicle body, and a through opening 9 through which the arm member 3 is protrudable is formed in the seal member 3.

4 Claims, 3 Drawing Sheets

US 6,871,449 B2

STRUCTURE OF DOOR OPENING/CLOSING APPARATUS

BACKGROUND OF THE INVENTION

This invention relates to a structure of a door opening/closing apparatus for a vehicle.

A conventional door opening/closing apparatus typically includes an arm member coupled with a door, and a driving unit provided inside a vehicle to drive the arm. The arm member is arranged to be protrudable from inside of a vehicle body, through the space which the door occupies when closed, pushing the door open and pulling the door shut. To give an example of the conventional door opening/closing apparatus, Japanese Laid-Open Patent Application, Publication No. 2000-335245 (corresponding to U.S. Pat. No. 6,401,392) discloses a power operated apparatus for a vehicle door, in which for the purpose of securing as wide a door opening as possible, a through opening for letting in and out the arm member is provided in a rear-end body panel separately at a position outside of an inner peripheral edge of the rear-end body panel defining the door opening of the vehicle body.

However, according to the above structure, a through opening need be formed outside of the border of the door opening, i.e., in a rear-end body panel (normally comprised of an inner body panel and an outer body panel) of the vehicle body, thus necessitating a reinforcement for enhancing rigidity of the body panel along and near an inner periphery thereof defining the through opening. Moreover, to prevent water (moisture), dust, etc. from entering the interior of the vehicle body through the through opening, a waterproof structure and/or a seal member for enhancing hermeticity of the through opening need be provided, which would disadvantageously increase the complexity of the structure as a whole.

The present invention has been created to address the above-discussed problems, and it is one exemplary object of the present invention to provide a structure of a door opening/closing apparatus allowing a door opening to have as wide an area as possible, which structure can serve to obviate the need for including a reinforcement structure or an additional seal structure, so that the door opening/closing apparatus can be simplified in structure.

SUMMARY OF THE INVENTION

According to one exemplary aspect of the present invention, there is provided a structure of a door opening/closing apparatus, which includes an arm member coupled to a door of a vehicle and a driving unit provided inside a vehicle body of the vehicle to move the arm member. The arm member is arranged to be protrudable from inside of the vehicle body, through a space which the door occupies when closed, pushing the door open and pulling the door shut. A seal member is provided along an inner peripheral edge of a body panel defining a door opening of the vehicle body, and a through opening through which the arm member is protrudable is formed in the seal member. This structure realizes the following advantageous features. While providing a door opening having as wide an area as possible, this structure serves to obviate the need for including a reinforcement structure or an additional seal structure, as necessitated in the conventional structure as described above. Consequently, a more simplified structure can be achieved.

The above seal member may preferably include a first seal member and a second seal member, such that the through opening is formed in the first seal member, and that the second seal member is formed separately from the first seal member and provided contiguously to the first seal member. According to this structure, the fittedness of the seal member to the inner peripheral edge of the body panel defining the door opening is improved, for example, when the first seal member is fitted to a corner portion of the inner peripheral edge of the body panel defining the door opening, so that the seal member (first seal member) can be neatly attached thereto even if the corner portion, as rounded, has a small radius of curvature. This serves to enlarge the inner peripheral edge of the body panel defining the door opening outward, and advantageously to broaden the area of the door opening.

The first seal member may preferably be formed by molding. The first seal member that has been formed in advance by molding can assume an adequately designed shape, so that the first seal member to be provided with a through opening and to be attached to the corner portion of the door opening can neatly be fitted to the corner portion, and can include a desirable shape of the through opening. Consequently, a quality product can be obtained through a process efficient in productivity.

The above first seal member may preferably be made of material harder than that which the second seal material is made of. If the material of the first seal member is harder than that of the second seal member, the first seal member to be provided with a through opening is deemed to be a component of which a reinforcement capability is highly valued; thus, rigidity of the first seal member can easily be increased. Further, the second seal member made of relatively soft sealant is deemed to be a component of which a sealing capability is highly valued; thus high level of sealability as desired can be ensured.

Other objects and further features of the present invention will become readily apparent from the following description of preferred embodiments with reference to accompanying drawings.

DETAILED DESCRIPTION OF THE PREFERRED EMBODIMENTS

Preferred embodiments of the present invention will be described with reference to the drawings.

Figure 1:
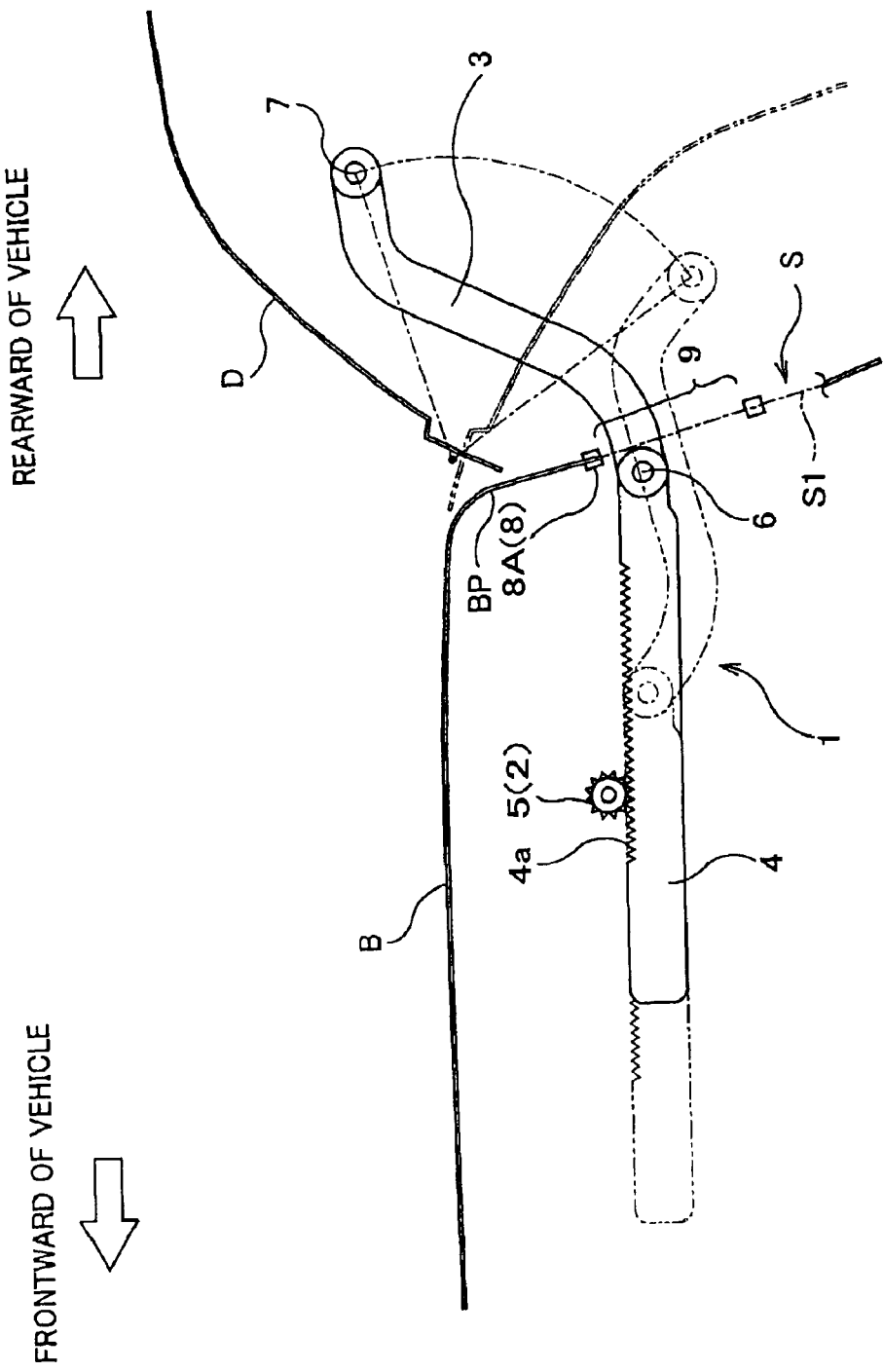
FIG. 1 is an explanatory schematic diagram illustrating a side view of a door opening/closing apparatus.
Figure 2:
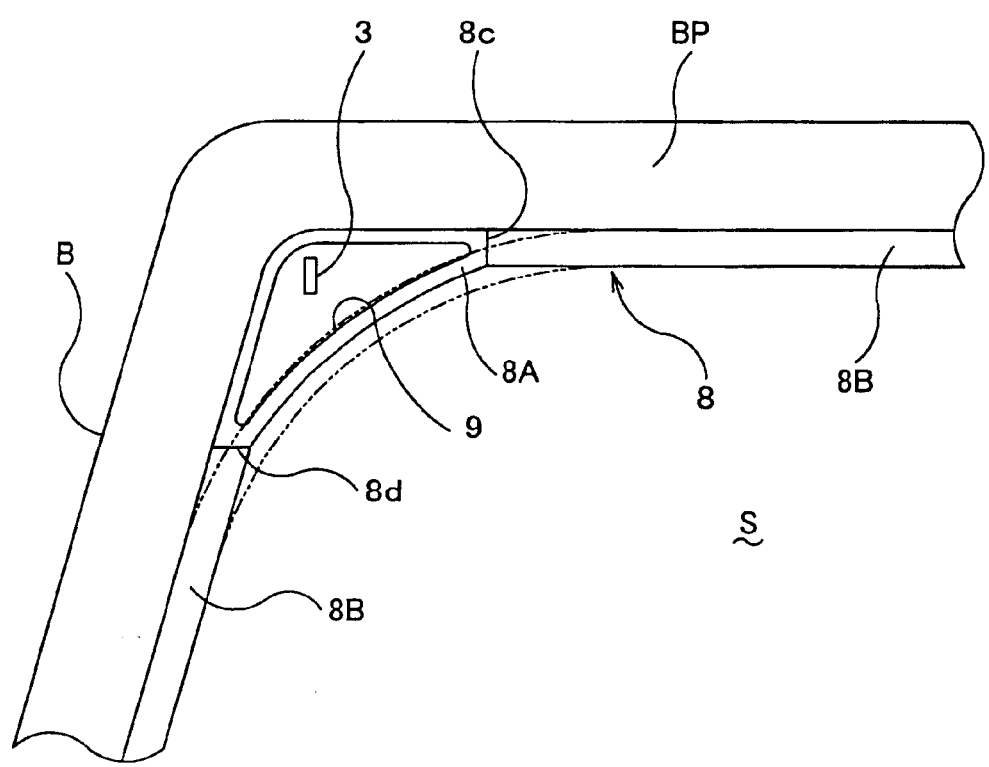
FIG. 2 is an explanatory schematic diagram illustrating an elevation of the door opening/closing apparatus as viewed from rearward of a vehicle.
Figure 3A:
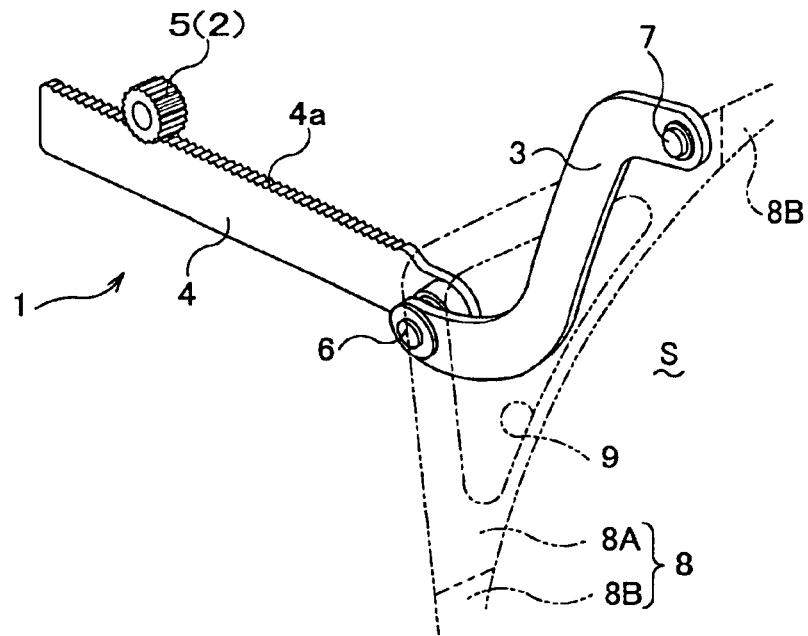
FIG. 3A is an external view, in perspective, of the door opening/closing apparatus with a door wide open.
Figure 3B:
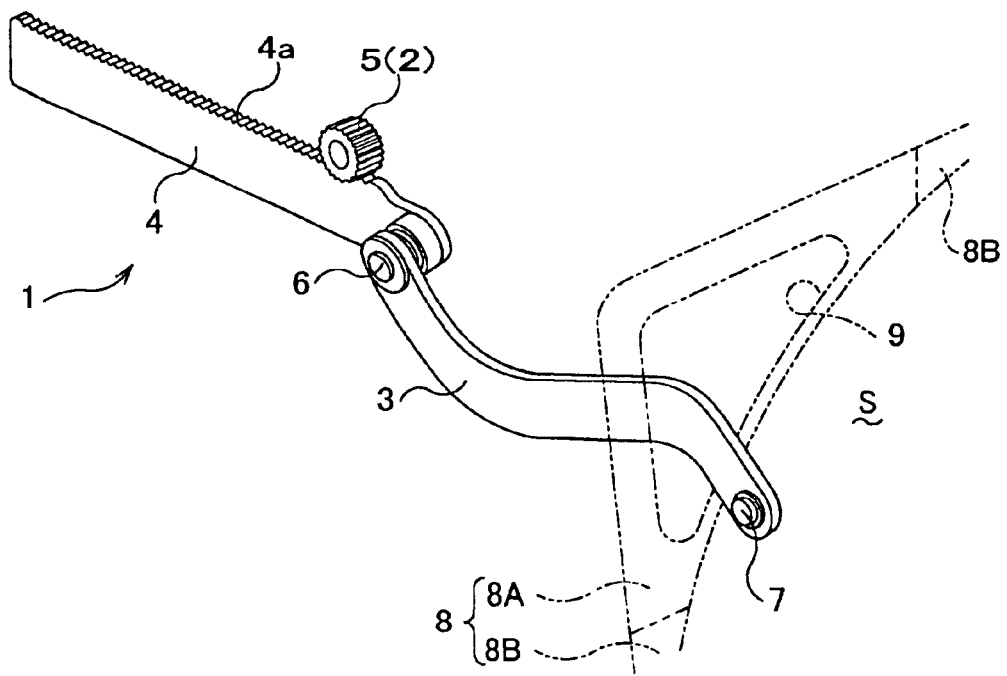
FIG. 3B is an external view, in perspective, of the door opening/closing apparatus with a door properly closed.

In FIG. 1, a door opening/closing apparatus 1 exemplifying a structure of a door opening/closing apparatus according to the present invention is embodied in a back door (hereinafter referred to simply as "door") D of a wagon-type vehicle. The door D is attached to the vehicle body B at or near a rear edge of the roof thereof in such a manner that the door D can swing on an axis oriented in a widthwise direction of the vehicle. The opening/closing apparatus 1 includes a driving unit 2 that is provided on an interior-compartment side of an opening S of the door D (the opening S is a space defined by a rear-end panel BP of the vehicle body B as shown in FIGS. 1 and 2), i.e., within the vehicle body B. The opening/closing apparatus 1 also includes an arm member 3 that is driven by the driving unit 2 to protrude toward outside of the vehicle body B beyond the opening S (more specifically, to the outside of a surface S1 shown in FIG. 1 containing a virtual surface of the opening S, i.e., through a space which the door occupies when closed), and a protrudable end of the arm member 3 is coupled to the door D.

The driving unit 2 typically includes an electric motor (not shown) and the like. As a driving force transmission mechanism for transmitting a driving force from the driving unit 2 to the arm member 3, for example, a rack-and-pinion mechanism may be used. As shown in FIG. 1 and other drawings, a slider member 4 is a plate-like member that is supported with a bracket (not shown) provided in the interior compartment of the vehicle, and that is movable in front and rear directions of the vehicle. Rack teeth 4a are formed on an upper edge of the slider member 4 along the front and rear directions of the vehicle. An output gear 5 is connected with an output shaft of the driving unit 2 (e.g., electric motor) directly or via a gear or the like, and engages with the rack teeth 4a. Accordingly, as the output gear 5 rotates in normal and reverse directions, the slider member 4 reciprocates linearly in the front and rear directions of the vehicle.

The proximal end and distal end of the arm member 3 are pivotally coupled to the slider member 4 and the door D, respectively. To be more specific, the proximal end of the arm member 3 is coupled to a rearward portion of the slider member 4 using a coupling 6 in such a manner that the arm member 3 can pivot on an axis oriented in a widthwise direction of the vehicle, while the distal end of the arm member 3 is coupled to the bracket (not shown) fixed on the door D using a coupling 7 in such a manner that the arm member 3 and the door D can pivot on an axis oriented in a widthwise direction of the vehicle. In other words, the coupling 6 is a component that reciprocates linearly in the front and rear directions, and the coupling 7 is a component that revolves about the axis on which the door D swings. In this arrangement, a straight reciprocating motion of the slider member 4 is converted into a rotational motion of the arm member 4, thus enabling opening and closing of the door D.

A brim or border of an opening S provided in the rear-end panel PB, i.e., inner peripheral edge of the rear-end body panel PB defining the opening S is provided with a seal member 8. When the door D is properly closed, the seal member 8 makes sealing contact with the inside of the door D, to prevent water, dust, etc. from entering the interior of the vehicle body. The seal member 8, which is made of rubber or other elastic material, is attached to inner peripheral edge of the rear-end body panel PB defining the opening S by fitting a groove formed in an outer peripheral edge of the seal member 8 onto the inner peripheral edge of the rear-end body panel PB defining the opening S, in such a manner that the seal member 8 sandwiches the inner peripheral edge of the rear-end body panel PB defining the opening S so that the front and back sides of the inner peripheral edge are held by inner walls of the groove.

In the seal member 8 is formed a through opening 9 such that the interior of the vehicle communicates with the outside of the vehicle, and the arm member 3 is arranged so as to protrude through the through opening 9. In the present embodiment, the seal member 8 is, as shown in FIG. 2, comprised of a first seal member 8A in which the through opening 9 is formed, and a second seal member 8B formed separately from the first seal member 8A and provided contiguously to the first seal member 8A onto the inner peripheral edge of the rear-end body panel PB defining the opening S.

The first seal member 8A is attached at each upper corner of the opening S. The portion at the upper corner (corner portion) of the opening S is rounded (curved) but has only a relatively small radius of curvature, and the first seal member 8A is fitted on part of the inner peripheral edge of the rear-end body panel PB defining the opening S so as to cover the curved portion as well as short straight portions thereof extending from the curved portion toward the widthwise direction and the downward direction respectively. In the present embodiment, the first seal member 8A, as shown in FIG. 2, has a substantially triangular shape as viewed from the front (i.e., as a rear elevation of the vehicle), and the through opening 9 as well has a similar substantially triangular shape as viewed from the same direction. The second seal member 8B is fitted on part of the inner peripheral edge of the rear-end body panel PB defining the opening S so as to cover the remaining straight portions thereof with end portions of the second seal member 8B contiguous to the first seal member 8A being butt-joined to the end portions (side end 8c and lower end 8d) of the first seal member 8A.

The above arrangement in which the arm member 3 is passed through the through opening 9 provided in the seal member 8 can allow the opening S to have as wide an area as possible, and to save the need for including a reinforcement structure and additional seal structure, which would be necessitated for the through opening provided in the rear-end panel BP.

Further, the above arrangement in which the first seal member 8A formed separately from the second seal member 8B is provided with the through opening 9 and fitted into the corner portion of the opening S has the following advantageous features. Assuming that the seal member 8 had a single-piece structure without containing separate first and second seal members 8A and 8B, the curved corner portion disadvantageously could not have such a small radius of curvature as above, but rather should be prepared to have a larger radius of curvature as indicated by phantom lines in FIG. 2, in consideration of fittedness of the seal member 8 to the corner portion in that the seal member 8 should be bent upon attachment so as to conform to the curved corner portion. To be more specific, if the seal member 8 were bent so as to conform to the curved portion having a small radius of curvature, a gripping power of the seal member 8 holding the front and back sides of the inner peripheral edge of the rear-end body panel PB defining the opening S would declines, and thus the sealing capability thereof would disadvantageously be impaired.

In contrast, provision of the first seal member 8A as a small piece neatly fitted to the corner portion of the opening S serves to prevent the seal member 8 from undergoing tensile load which would otherwise be given much from the straight portions, and thus improves the fittedness of the seal member 8 to the corner portion, whereby the seal member 8 can be neatly attached to the inner peripheral edge of the rear-end body panel PB defining the door opening S even if the curved corner portion has a small radius of curvature. Consequently, the inner peripheral edge of the rear-end body panel PB defining the door opening S may be broadened outwardly, and the area of the door opening S can be further expanded.

In the above arrangement, the first seal member 8A may be formed by molding. By forming the first seal member 8A utilizing a mold, the first seal member 8A can be formed beforehand into an adequate shape to conform to the corner portion of the opening S. Therefore, the fittedness of the seal member 8 to the corner portion can be improved, and the through opening 9 can be formed into an adequate shape as desired. Consequently, a quality product can be obtained through a process efficient in productivity.

The above first seal member 8A may be made of material harder than that which the second seal member 8B is made of. For example, the first seal member 8A is made of ebonite or hard rubber material, while the second seal member 8B is made of soft rubber. Accordingly, the first seal member 8A to be provided with the through opening 9 is deemed to be a component of which a reinforcement capability is highly valued; thus, rigidity of the first seal member 8A can easily be increased. On the other hand, the second seal member 8B made of relatively soft sealant is deemed to be a component of which a sealing capability is highly valued; thus high level of sealability as desired can be ensured.

Although the preferred embodiments of the present invention have been described above, the layout, shape, number, etc. of each component are not limited to the embodiments as described above or illustrated in the accompanying drawings, and various modifications and changes may be made in the present invention without departing from the spirit and scope thereof.

In conclusion, according to the present invention, in a door opening/closing apparatus allowing a door opening to have as wide an area as possible, an improved structure is provided which can serve to obviate the need for including a reinforcement structure or an additional sealing structure, so that the door opening/closing apparatus can be simplified in structure.

What is claimed is:

1. A structure of a door opening/closing apparatus, comprising:

an arm member coupled to a door of a vehicle which closes a door opening of a body panel; and a driving unit provided inside a vehicle body of the vehicle to move the arm member, wherein the arm member is arranged to be protrudable from inside of the vehicle body, through a space which the door occupies when closed, pushing the door open and pulling the door shut; and wherein a seal member is provided along an inner peripheral edge of the body panel defining the door opening of the vehicle body, and a through opening in the seal member through which the arm member protrudes is formed in the seal member.

2. A structure of a door opening/closing apparatus according to claim 1, wherein the seal member includes a first seal member and a second seal member, the through opening being formed in the first seal member, and the second seal member being formed separately from the first seal member mid provided contiguously to the first seal member.

3. A structure of a door opening/closing apparatus according to claim 2, wherein the first seal member is formed by molding.

4. A structure of a door opening/closing apparatus according to claim 2, wherein the first seal member is made of material harder than that which the second seal material is made of.

* * * * *